US006050536A

United States Patent [19]
Bicknese

[11] Patent Number: 6,050,536

[45] Date of Patent: Apr. 18, 2000

[54] MUSIC SUPPORT AND TURNING AID

[76] Inventor: Frederick H. Bicknese, 81 Crest Dr., Summit, N.J. 07901

[21] Appl. No.: 09/150,644

[22] Filed: Sep. 10, 1998

[51] Int. Cl.[7] .......................... A47B 19/00; A47B 97/04; G10G 5/00; G09B 15/02

[52] U.S. Cl. ...................... 248/441.1; 248/443; 248/460; 84/472

[58] Field of Search ............................... 248/441.1, 460, 248/443, 447.1, 446, 453, 346.01; 108/27; 84/472, 471 R

[56] References Cited

U.S. PATENT DOCUMENTS

| | | | |
|---|---|---|---|
| 200,262 | 2/1878 | D'Auria | 248/443 |
| 409,340 | 8/1889 | Unz | 248/441.1 |
| 805,221 | 11/1905 | Muller | 248/443 |
| 860,397 | 7/1907 | Lyman | 248/443 |
| 1,117,386 | 11/1914 | Hughes | 248/446 |
| 1,476,838 | 12/1923 | Pratt | 248/441.1 |
| 2,247,597 | 7/1941 | Bofenkamp et al. | 248/441.1 |
| 2,814,142 | 11/1957 | Warwick | 248/441.1 |
| 3,794,284 | 2/1974 | Guenther | 248/441.1 |
| 4,113,212 | 9/1978 | Coriden | 248/13 |
| 4,123,922 | 11/1978 | Kuenstler | 70/58 |
| 4,497,125 | 2/1985 | Hutchinson | 248/488 |
| 4,936,034 | 6/1990 | Chen et al. | 248/441.1 |
| 4,991,817 | 2/1991 | VonKleist et al. | 248/441.1 |
| 5,208,084 | 5/1993 | Rutz | 248/345.1 |
| 5,678,800 | 10/1997 | Markussen | 248/346.01 |
| 5,722,628 | 3/1998 | Menaged | 248/441.1 |
| 5,797,570 | 8/1998 | Dolan et al. | 248/205.3 |

*Primary Examiner*—Ramon O. Ramirez
*Assistant Examiner*—David Heisey
*Attorney, Agent, or Firm*—Edward Goldberg

[57] ABSTRACT

A support for sheet music on a piano type instrument comprises a longitudinal block positioned on the ledge in front of the music stand and behind the raised ridge along the front of the ledge. The block has a trapezoidal cross section with a rearwardly inclined upper surface to hold the music pages against the music stand while raising the level of the bottoms of the music sheets above the raised ridge to permit a pianist to turn the pages freely without interference by the ridge.

5 Claims, 2 Drawing Sheets

MUSIC SUPPORT AND TURNING AID

BACKGROUND OF THE INVENTION

1. Field of the Invention

The present invention relates to a support for sheet music and particularly to a device which raises the position of music pages on a piano to aid in turning the pages over the usual ridge on the piano ledge in front of the music stand above the keyboard.

2. Description of the Prior Art

Previous music stands for pianos have included hinged supports having pivotable areas and springs to hold the stand in an extended angular position when in use and in a vertical position against the front piece of the piano when not in use, such as, shown in U.S. Pat. No. 355,001 to Casey. A similar music rack for an upright piano which pivots outwardly to hold the music sheets and folds back into a vertical position after use, is shown in U.S. Pat. No. 362,512 to James.

Another type of music holder for a piano, organ, or other instrument, or table, is shown in U.S. Pat. No. 458,074 to Shaw. In this case, spring fingers are actuated by a lever to hold the music pages in position on a shelf and then release them to permit turning of the pages.

U.S. Pat. No. 4,300,743 to Morris shows a sheet music support stand having an accessory tray providing a temporary storage area for holding items required by a musician when playing an instrument.

While various forms of such music support structures have been used, none have provided a solution to the problem of a raised ridge on the piano ledge in front of the music stand which interferes with the turning of music pages by a performing pianist.

SUMMARY OF THE INVENTION

It is therefore the primary object of the present invention to provide a support for sheet music which raises the level of the pages above the usual ridge on a piano ledge in front of the music stand above the keyboard to avoid interference with the turning of pages.

It is another object of the present invention to provide a longitudinal block having an upper inclined angular surface which supports sheet music against the music stand on a piano ledge while permitting turning of pages over the ridge on the piano ledge.

An additional object of the present invention is to permit a pianist using sheet music to turn pages while playing the piano without obstruction by the ridge in front of the music stand.

It is also an object of the present invention to provide a sheet music support device which is positioned on a piano ledge above the keyboards in a space between the music stand and a ridge in front of the stand to raise the music pages above the ridge to aid in turning the music sheets.

These objects are achieved with a novel longitudinal block having a lower flat surface resting on the piano ledge above the keyboards in the space between the music stand and the raised ridge in front of the stand. An upper flat surface is inclined at an angle toward the music stand to support sheet music against the music stand which is inclined at a rearward angle. Flat front and rear surfaces complete the block to form a trapezoidal cross-section which supports the sheet music at a height above the raised ridge so that the music pages can be freely turned over the ridge without interference. Other objects and advantages will become apparent from the following description in conjunction with the accompanying drawings.

DESCRIPTION OF THE PREFERRED EMBODIMENT

Figure 1:
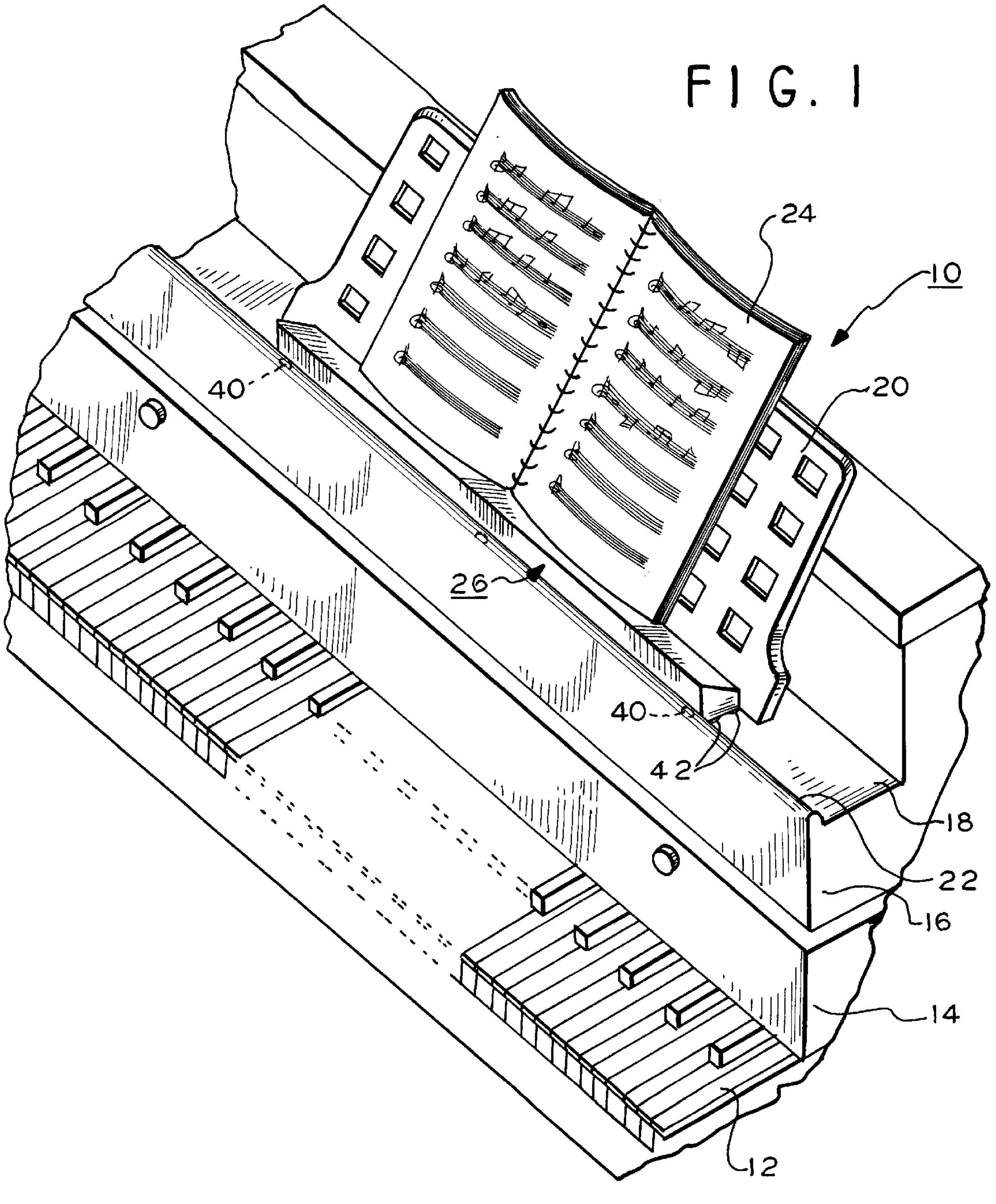
FIG. 1 is a partial front isometric view of a piano showing a keyboard, cover, upper ledge and music stand with the present music support and turning aid.

As shown in FIG. 1, a typical piano 10 includes a keyboard 12, a retractable cover 14, a front vertical face 16 above the cover, an upper horizontal ledge 18, and a pivotable music stand 20 spaced back on the upper ledge.

Most pianos also have a small raised ridge 22 at the front of the ledge which normally cooperates with the music stand to hold sheet music 24 on the upper ledge and prevent the music pages from slipping off the upper ledge.

It has been found, however, that the raised ridge interferes with the turning of the music pages by the pianist during the playing of the piano, particularly when pages in a bound publication must be turned quickly and easily by the pianist without losing the tempo of the music. The present invention provides a simple inexpensive solution to this problem by raising the level of the sheet music so that the bottoms of the page,s pass over the ridge without interference when turned.

Figure 2:
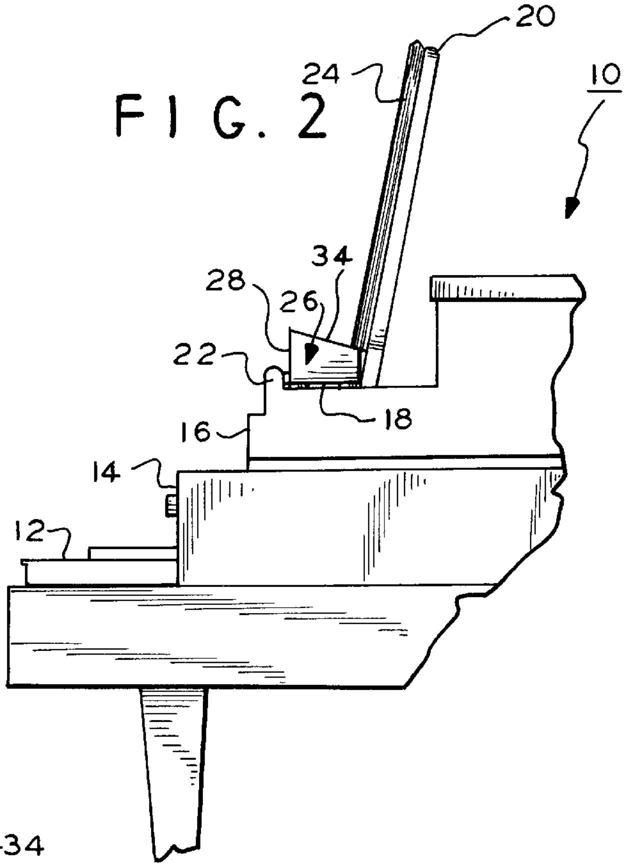
FIG. 2 is a partial side view of the piano including keyboard, cover, upper ledge, music stand and the present music support and turning aid.
Figure 3:
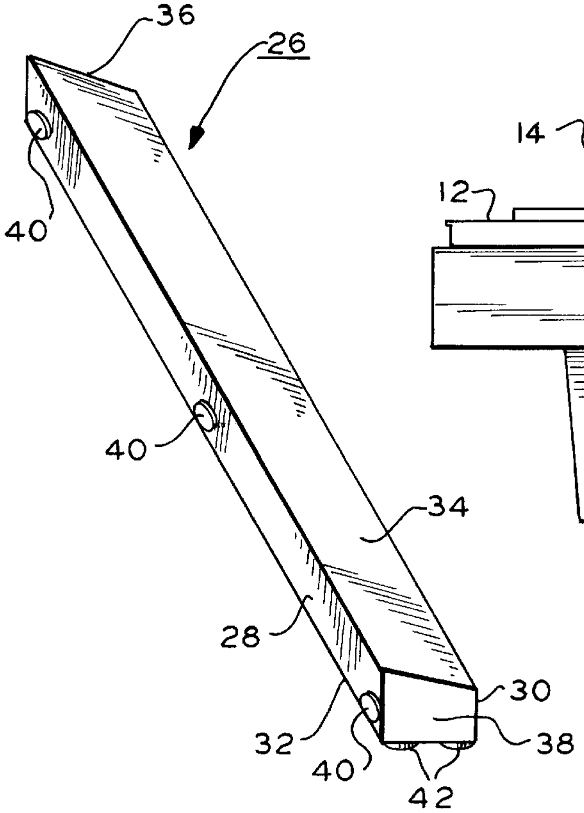
FIG. 3 is a side isometric view of the music support and turning aid.

This is accomplished with a uniquely shaped elongated block 26 which fits in the space on ledge 18 between the music stand 20 and the ridge 22 along the length of the music stand to support the music pages 24 above the level of the ridge. Ridge 22 also retains block 26 in position to prevent it from slipping off ledge 18. This is shown more clearly in the partial side view of FIG. 2 and in the isometric view of FIG. 3. The cross section of the music support 26 is preferably of a trapezoidal shape having front 28 and back 30 flat parallel vertical surfaces at right angles or perpendicular to a flat horizontal lower surface 32 which rests on ledge 18. As shown in more detail in FIG. 3, the upper flat surface 34 is inclined rearwardly at a suitable angle complementary to the angle of the music stand 20 so that the music sheets 24 rest against the stand it about the same angle as the stand. Opposite ends 36, 38 of block 26 are also preferably flat parallel vertical surfaces.

Figure 4:
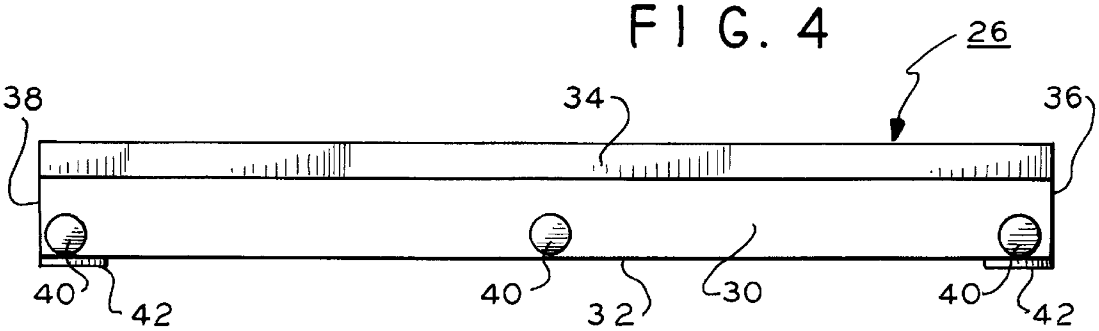
FIG. 4 is a rear view of the music support and turning aid.

Additional protective guards 40, as shown in FIG. 4, are preferably employed on the front and back surfaces at opposite ends and in the center to provide smooth contact areas which avoid possible scratching of the finished piano surfaces. These may be very thin small round clear plastic discs adhesively secured to the block 26 which is preferably of solid wood stained to match the piano finish. The entire block may also be made of a suitable smooth plastic material. Further protective guards 42 of a suitable thin round soft resilient material such as cork, or felt, are secured to the lower surface 32 at each end. While the present music support and turning aid has been primarily considered as a temporary removable item to assist a pianist during performance of the music, it may also be secured as a permanent addition to the piano if so desired.

The height and width of block 26 and angle of the upper surface can be varied to accommodate different types and sizes of pianos and provide a custom fit between the front ridge and music stand. The height of the back surface adjacent the music stand may also be made quite small to cooperate with music stands of various configurations. While only a single embodiment has been illustrated and described, other variations may be made in the particular configuration without departing from the scope of the invention as set forth in the appended claims.

What is claimed is:

1. A music support in combination with a keyboard instrument having an upper flat horizontal longitudinally extending ledge, a raised ridge along the front of the ledge, a rearwardly inclined music stand on said ledge spaced from the front of said ledge and adapted to hold pages of music to be played by a musician, comprising:

a longitudinal block resting on said ledge between said raised ridge and said music stand and extending along the length of said stand, said block having a trapezoidal cross section including a flat lower surface supported on said ledge, front and rear flat longitudinal surfaces extending upwardly above said ridge, an upper flat surface inclined rearwardly at an angle toward said music stand so that said rear surface adjacent said music stand is shorter in height than said front surface, said upper surface angle being complementary to the inclined music stand for supporting said music pages at a rearwardly inclined angle against said stand, and end surfaces having a relatively narrow width between said ridge and music stand, said block providing a support raising the bottoms of music pages above said ridge to avoid interference by said ridge when turning music pages.

2. The device of claim 1 wherein said front and rear surfaces are vertical.

3. The device of claim 2 including a plurality of thin flat discs secured along said front and rear surfaces for protection of adjacent instrument surfaces.

4. The device of claim 2 including a plurality of thin flat soft resilient discs secured along said lower surface for protection of the instrument ledge surface.

5. The device of claim 2 wherein the opposite ends of said block have flat surfaces of a trapezoidal shape.

* * * * *